United States Patent [19]

Rossmy et al.

[11] 4,079,098
[45] Mar. 14, 1978

[54] PROCESS FOR THE PRODUCTION OF POLYORGANOSILOXANE BLOCK COPOLYMERS

[75] Inventors: Gerd Rossmy, Haltern-Lavesum; Hans-Joachim Kollmeier, Essen, both of Germany

[73] Assignee: Th. Goldschmidt AG, Essen, Germany

[21] Appl. No.: 590,271

[22] Filed: Jun. 25, 1975

[30] Foreign Application Priority Data

Jun. 29, 1974 Germany ............................. 2431394

[51] Int. Cl.$^2$ ............................................. C08L 83/10
[52] U.S. Cl. .................................................. 260/827
[58] Field of Search ........................................ 260/827

[56] References Cited

U.S. PATENT DOCUMENTS

| | | | |
|---|---|---|---|
| 3,051,684 | 8/1962 | Morton et al. ....................... 260/46.5 |
| 3,244,664 | 4/1966 | Zelinski ................................... 526/20 |
| 3,468,972 | 9/1969 | Hsieh ..................................... 260/836 |
| 3,483,270 | 12/1969 | Bostick ................................... 260/827 |
| 3,637,899 | 1/1972 | Manetkin et al. ..................... 260/827 |
| 3,678,125 | 7/1972 | Saam et al. ............................ 260/827 |
| 3,840,616 | 10/1974 | Clark et al. ........................... 260/827 |
| 3,867,295 | 2/1975 | Schwab et al. ....................... 260/827 |
| 3,928,490 | 12/1975 | Hergenrother ....................... 260/827 |

FOREIGN PATENT DOCUMENTS

| | | |
|---|---|---|
| 786,865 | 6/1968 | Canada. |
| 1,308,459 | 2/1973 | United Kingdom. |

*Primary Examiner*—Paul Lieberman
*Attorney, Agent, or Firm*—Toren, McGeady and Stanger

[57] ABSTRACT

Block copolymers of linear or branched, polyorganosiloxanes and organic polymers are prepared by reacting at least approximately equilibrated polyorganosiloxanes having reactive silyl end groups with terminally organoalkalifunctional organic polymers.

15 Claims, No Drawings

PROCESS FOR THE PRODUCTION OF POLYORGANOSILOXANE BLOCK COPOLYMERS

FIELD OF INVENTION

The invention is directed to a procedure for the production of block copolymers composed of linear or branched polyorganosiloxanes and organic polymers.

BACKGROUND INFORMATION AND PRIOR ART

Polyorganosiloxane block copolymers have already partly been described in the literature. For example, in the procedures disclosed in U.S. Pat. Nos. 3,678,125 and 3,678,126 and German Patents 2,142,594, 2,142,595 and 2,142,664, an organic monomer is polymerized with mono- or polyfunctional lithiumorganic initiators and hexamethylcyclotrisiloxane is subsequently polymerized to the resulting lithium functional polymers. In this manner, molecularly uniform block copolymers of configurations AB, BAB or $AB_n$ are obtained and, through subsequent coupling reactions, also those of configurations ABA, $(AB)_x$ or $(BAB)_x$.

However, no block copolymers can be obtained by this procedure, which are branched in the polyorganosiloxane chain, i.e. which belong to the configuration type $BA_n$, wherein B is a single or multiple branched polyorganosiloxane block and A is a linear organic polymer block, or whose polyorganosiloxane blocks still contain one or more silicon-functional groups, such as, for example, silicon-hydrogen or silicon-halogen groups.

Moreover, only hexaorganocyclotrisiloxanes can be used as starting compounds for the synthesis of the polyorganosiloxane blocks according to this prior art anionic polymerization procedure. Hexaorganocyclotrisiloxanes, however, belong to the less accessible, more expensive substances among the low-molecular weight, organosilicon compounds.

It is furthermore known from U.S. Pat. No. 3,244,664 that mono- or polyalkalifunctional organic polymers react with acyclic organosiloxane compounds containing 2 to 12 silicon atoms and at least two halogen, alkoxy, amino or alkylthio groups bound to silicon. This reaction yields terminally silyl-modified, organic polymers. This procedure thus results in polymeric materials in which organic polymer blocks are linked together by short organosiloxane blocks. The organosiloxane blocks of these compounds are, however, not equilibrated prior to their reaction with the polyalkalifunctional polymers, i.e., their average molecular weights are not in approximate statistical equilibrium. Consequently, materials are obtained by this synthesis, whose properties are not clearly reproducible. As a result of their short, non-equilibrated organosiloxane blocks, these systems furthermore possess only incompletely those properties which are characteristic of block copolymers as, for example, two glass transition temperatures, micelle formation, phase separation as well as compatibility with the two corresponding homopolymers and emulsifier activity.

German Pat. No. 1,720,855 furthermore discloses the reaction of at least partially equilibrated polyorganosiloxanes of the general formula

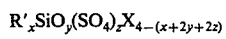

wherein
- R' is a monovalent hydrocarbon group,
- X is halogen atom which can partly be replaced by the $-OSO_3H$ group and
- $x = 1.5 - 2.1$,
- $y = 0.5 - 1.3$,
- $z = 0.0001 - 0.2$ and
- $4 = >(x+2y+2z)>2$, with terminally alkalifunctional hydrocarbon polymers, to form block copolymers, the corresponding alkali salts being split off.

Block copolymers, which contain these polyorganosiloxanes as constituents, do, however, exhibit some disadvantages both in their method of preparation and in their properties. The equilibration of polyorganosiloxanes with $H_2SO_4$ proceeds gradually slower with increasing molecular weight of the polyorganosiloxanes, since the catalyst is consumed by being incorporated in the polyorganosiloxane chain. In addition, the viscosity of the resulting products becomes uncomfortably high. Furthermore, the stability of the block copolymers made with these polyorganosiloxanes, particularly at elevated temperatures and in the presence of moisture, is inadequate and the compounds tend to discolor at elevated temperatures. This deficient stability and the tendency to discolor are caused by the presence in the block copolymer of residual $H_2SO_4$, which was used to equilibrate the starting siloxanes.

SUMMARY OF THE INVENTION

It is, therefore, the primary object of the present invention to overcome the disadvantage of the prior art procedures and to make available hydrolytically stable block copolymers, linked by SiC-bonds and comprising at least one organic polymer block and at least one, at least approximately equilibrated, polyorganosiloxane block which may be linear or branched, in which 0 to 10% of the silicon atoms may contain groups which are capable of crosslinking such as, for example, SiCl, SiH, SiOH, SiOH and SiOR, and which, after crosslinking, are stable at elevated temperatures and in the presence of moisture and do not tend to discolor.

The above object is successfully and surprisingly attained pursuant to this invention by a procedure which is characterized in that polyorganosiloxanes, which are at least approximately equilibrated and which have reactive silyl end groups and correspond to the general structure

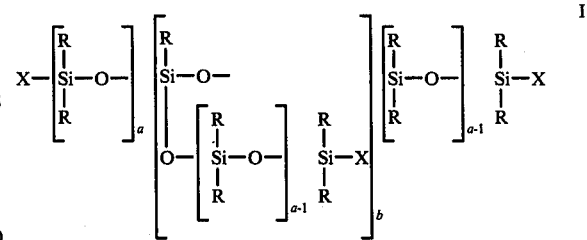

I wherein
X represents halogen and/or the group $R'SO_3$, in which R' is alkyl, aryl or alkaryl,
R is alkyl or aryl,
in the average molecule, $a = 2 - 200$ and $b = 0$ to $50$ and the ratio of R groups which are bound to Si atoms that are not trifunctional, to such R groups which are bound to trifunctional Si atoms being at least 4, are reacted with terminally organoalkali-functional, organic polymers, under splitting off alkali halide or alkali sulfonate.

Particularly preferred is the use of polyorganosiloxanes of the general structure I, in which
X represents chlorine and/or the $R'SO_3$ group, $R'$ being methyl or p-tolyl,
R is methyl,
$a = 6$ to 100 and
$b = 0$ to 10.

A portion of the R groups may, however, also be hydrogen or may represent a different, substituted alkyl or aryl group with 1 to 20 carbon atoms which is inert towards acids such as, for example $-C_2H_5$, $n-C_3H_7-$, $C_6H_5-$, $-CH_2Br$, $-(CH_2)_3Cl$, $-(CH_2)_3OCF(CF_3)_2$, $-(CH_2)_3OC(CF_3)_2CF(CF_3)_2$, $-CH_2CH_2CF_3$.

Naturally, the R groups must not contain any groups which may react with organoalkali-functional end groups of the organic polymer groups.

In the above formula, a and b are so chosen that there are in the average molecule 6 to 500, preferably 13 to 200, Si atoms and that the ratio of the R groups, which are bound to Si atoms that are not trifunctional, to such R groups which are bound to trifunctional Si atoms, is preferably at least 4.

If desired, X may be a bromine atom. A portion of the X groups may also be a triorganosiloxy group, especially the trimethylsiloxy group.

The polyorganosiloxanes which are at least approximately equilibrated and which have reactive terminal silyl groups in accordance with Structure I, are obtained by equilibration of the following starting materials:

(a) Mixtures of organohalogen silanes such as, for example, $(CH_3)_2SiCl_2$ or $CH_3SiCl_3$ and polyorganosiloxanes, especially cyclic polyorganosiloxanes such as, for example, $[(CH_3)_2SiO]_4$.

(b) Mixtures of polyorganosiloxanes with and without silylhalide end groups, such as are obtained, for example, by partial hydrolysis of organohalogensilanes.

The equilibration of the above-named mixtures can be performed with anhydrous $FeCl_3$ as catalyst. The equilibration is preferably carried out in the presence of hydrogen halide, preferably hydrogen chloride. The amount of catalyst used is generally in the range of 0.0001 to 1.0% by weight, preferably 0.01 to 0.1% by weight $FeCl_3$. The equilibration is carried out with or without the use of an inert solvent and at temperatures between 0° and 200° C, preferably between 20° and 120° C. After the equilibration, the catalyst is removed by filtration, if necessary with the addition of an auxiliary such as anhydrous, activated charcoal.

A further, preferred process for the production of at least approximately equilibrated polyorganosiloxanes with silylhalide end groups, which can be used in accordance with this invention, is the equilibration of the above-named mixtures while using mixed catalysts of hydrogen halide acid and peralkylated acid amide at temperatures between 50° and 110° and, if necessary, at elevated pressure. The amounts of mixed catalysts used range from between 0.002 to 0.2 moles/siloxane bond. After equilibration, the catalyst system is removed by phase separation.

Polyorganosiloxanes, which can be used in accordance with the invention and which are at least approximately equilibrated, can furthermore be obtained when mixtures of polyorganosiloxanes, which result from the partial hydrolysis of organohalogensilanes and which to some extent contain polyorganosiloxanes with terminal silylhalide groups, are reacted with organosulfonic acids of the general formula $R'SO_3H$, in amounts of 0.005 to 0.02 equiv./mole of siloxane bond and at temperatures of 10° to 100° C. In this reaction, monosulfonic acid groups, $R'SO_3$, in which $R'$ has the above meaning, are incorporated terminally, with equilibration of the siloxane mixture and liberation of hydrogen halide. The hydrogen halide is removed at the end of the reaction, for example, by evacuating.

In polyorganosiloxanes of the general Structure I, produced in this manner, at least 3 and preferably 20% and more of all X groups may represent the $R'SO_3$ group. As compared to $H_2SO_4$ equilibrated ones, these polyorganosiloxanes have the advantage of lower viscosity since the monosulfonic acid groups are exclusively incorporated terminally.

Further starting materials for the process in accordance with this invention are terminally mono- or polyorganoalkalifunctional, organic polymers which can be made by anionic "living" polymerization of unsaturated, organic monomers.

Preferred monomers are conjugated dienes and vinyl-substituted aromatic compounds such as, for example, butadiene, isoprene, piperylene, styrene, α-methylstyrene or vinylnaphthalene.

The conjugated dienes and the vinyl-substituted aromatic compounds can be polymerized to homopolymers, to statistical copolymers or to block copolymers. Block copolymers can be prepared by first polymerizing one monomer and subsequently polymerizing the second monomer directly to the preformed polymer block.

The formation of the terminally organoalkali-functional polymers results when the named monomers or their mixtures are brought into contact with a low molecular weight alkaliorganic initiator in an aprotic solvent and under an inert gas atmosphere.

Alkaliorganic compounds, which can be used as initiators for the polymerization of the monomers, contain 1 to 4, preferably 1 or 2, alkali metal atoms linked to different carbon atoms. Examples of such compounds are given in U.S. Pat. No. 3,244,664. Best results are frequently obtained with organolithium initiators. Organolithium compounds are therefore preferred as initiators.

n-Butyllithium is preferred as monofunctional initiator. Of the known bifunctional initiators, 1,2-dilithium 1,2-diphenylethane and α,ω-dilithiumisoprene oligomers with an average of six isoprene units per molecule and lithiumnaphthalene are preferred.

The amount of initiator which is used for the polymerization of a predetermined amount of a monomer is determined by the desired average molecular weight of the organic polymer block. Each of the organoalkali groups of an initiator molecule initiates one polymerization chain. The organic moiety of the initiator is normally incorporated into the polymer and the alkali atoms are linked to the end of the polymer. With mono- or difunctional initiators, terminally mono- or dialkalifunctional polymers result, whose average molecular weight $M_n$ is given by the formula $$M_n = \frac{\text{Mol Monomer}}{\text{Mol Initiator}} \cdot M_a + M_1$$

wherein $M_a$ is the molecular weight of the monomer and $M_1$ the molecular weight of the organic moiety of the initiator that may be incorporated in the polymer.

The carrying out of the anionic polymerization of unsaturated hydrocarbon monomers with organoalkali-functional initiators is, in itself, generally known. The polymerization is conducted under the exclusion of air and moisture, at temperatures between −50° and 150° C, in aprotic solvents. For example, saturated aliphatic hydrocarbons, aromatics and cyclic or acyclic ethers are particularly suitable solvents.

According to the process in accordance with this invention, the approximately equilibrated, linear or branched polyorganosiloxanes, which contain two or more halogen or $R'SO_3$ terminal groups linked to silicon, are reacted with the terminally organoalkali-functional organic polymers to form block copolymers.

The combination of the polymeric portions through SiC bonds takes place while alkali halides or alkali sulfonates split off. The reaction is preferably carried out in an aprotic medium, while excluding the effects of air and moisture. Saturated aliphatic, cycloaliphatic or aromatic hydrocarbons, or acyclic or cyclic ethers such as, for example, benzene, toluene, n-hexane, cyclohexane, tetrahydrofuran, dioxane, diethyl ether or anisole, may be used as diluents. The reaction is preferably carried out in the presence of at least 1% by weight, based on the amount of diluent, of a polar solvent such as, for example, an acyclic or cyclic ether.

The temperatures, at which the reactions are carried out, are not critical and may be between −70° and 150° C; preferred reaction temperatures are between 0° and 50° C.

In the reaction of the two terminally reactive polymeric components, it is advantageous to add a solution of the organoalkali-functional organic polymer to a solution of the functional, equilibrated polyorganosiloxane. The reaction can be carried out stochiometrically relative to the reactive chain ends, or it can be conducted in such a manner that the molar amount of the organoalkali groups used is less than the molar amount of the silylchloride or silylorganosulfonate groups present in the polyorganosiloxane employed. In this case, reactive silyl groups remain in the polyorganosiloxane blocks of the block copolymers that are formed. Conversely, the molar ratio of organoalkali groups to reactive silyl groups shall preferably, however, not exceed the value of 1, since residual organoalkali-functional groups can lead to splitting of siloxane bonds.

The block copolymers formed can be isolated from their reaction solutions by the usual methods. The compounds are frequently sufficiently insoluble in low molecular weight alcohols, such as methanol or ethanol, so as to be precipitated quantitatively when such nonsolvents are stirred into their solutions. The may also be recovered or isolated by removing the solvents. The precipitated alkali salts are preferably first separated by filtration from the reaction solutions.

Block copolymers, which still contain reactive silyl groups in their polyorganosiloxane blocks, can subsequently be subjected to known reactions by which the silylhalide or silylorganosulfonate groups are transformed into less moisture-sensitive groups such as, for example $\equiv SiOCH_3$, $\equiv SiOC_2H_5$, $\equiv SiOH$, $\equiv SiNH_2$ or $\equiv SiN(CH_3)_2$. These compounds are then capable of crosslinking by further reactions, also known to the skilled art worker.

Different configurations of block copolymers are formed, depending on the number of reactive groups in the polymeric preproducts and on the molar reaction ratios used. Monofunctional organic polymers and di- or polyfunctional polyorganosiloxane yield the configurations ABA, $A_nB$, when A is the organic polymer block and B the polysiloxane block. The difunctional organic polymers and difunctional polyorganosiloxanes can lead to block copolymers of the configurations BAB and $(AB)_x$.

The block copolymers, made in accordance with this invention, are, molecularly, relatively uniform and contain practically no, or only a slight proportion of homopolymers.

The block copolymers can vary within a wide range in the chemical composition of their polymeric blocks, in their overall structure, in the average molecular weights and structures of their blocks as well as in their proportions by weight. Substances with very different chemical and physical properties, for which there are many application possibilities, can therefore be prepared.

It is well known that block copolymers are compatible with the homopolymers that make up their blocks. Mixtures of block copolymers with one of the corresponding homopolymers form systems in which the incompatible component of the block copolymer is distributed uniformly and in a stable manner in the homopolymer phase or after migration to the surface forms an abrasion- and solvent-resistant surface film. These effects can be used for modifying the bulk and surface properties of organic polymers or the bulk properties of polysiloxanes. For instance, the tensile strength, impact strength, and toughness of polystyrene, as well as frictional (gliding) properties and weathering resistance of its surface can be significantly improved by the addition of polystyrenepolyorganosiloxane block copolymers.

Furthermore, by the addition of block copolymers of the configuration AB or ABA and BAB, organic polymers and polyorganosiloxanes can be mixed to form homogeneous dispersions, provided that the block of the block copolymers are identical, or at least compatible with the polymeric components that are to be mixed.

Such processes for homogeneously dispersing polymers are frequently carried out in the art at elevated temperatures, for example, in the melt. Polyorganosiloxane block copolymers, which tend to discolor because residual catalyst such as $H_2SO_4$ is still present, are therefore less suited for such applications than polymers, made in accordance with this invention, which do not show this disadvantage.

Block copolymers, in the form of pure substances or as mixtures with organic polymers with which they are compatible, can successfully be applied as separating, hydrophobic, property-imparting or friction-reducing coatings on a substrate phase. They can be applied from solution, from dispersion or from the melt, with or without the aid of a primer. Solid to wax-like block copolymers or polymer mixtures, which can be poured from solution, dispersion or the melt to form homogeneous films, offer the advantage that a solid, coherent polyorganosiloxane coating can be applied directly, without requiring a subsequent hardening.

In this form of application, it is often particularly important that the surface films are not subsequently altered by hydrolytic effects. If the polyorganosiloxane block copolymers are applied to textile fibers, for example, as hydrophobic, property-imparting or friction-reducing coatings, the highest possible stability towards the effects of moisture, such as, for example, resistance to the effects pf laundering, is required. The block copolymers, made according to this invention, show a far greater stability towards hydrolytic effects than those which contain polyorganosiloxane blocks which were equilibrated with $H_2SO_4$. In addition, it may be necessary, as it is, for example, in finishing textiles or in separating coatings, to treat the coated substrate subsequently at higher temperatures. In such a case, those block copolymers, containing polyorganosiloxane blocks equilibrated with $H_2SO_4$, can lead to undesirable discoloration in contrast to block copolymers made according to the invention.

The invention will now be described by several Examples, it being understood that these Examples are given by way of illustration and not by way of limitation and in no way limit the scope of the invention as recited in the appended claims.

Preparation of Starting Product

An α,ω-dichloropolydimethylsiloxane, which is at least approximately equilibrated and which has an average chain length of N = 120, is prepared by telomerizing 267 g of octamethylcyclotetrasiloxane with 3.9 g of dichlorodimethylsilane and subsequently equilibrating the telomerisate with 0.27 g of $FeCl_3$ at 50° C in the presence of a small amount of dry HCl. A clear, viscous product is obtained after separating the precipitated equilibration catalyst.

| Calculated: | Found: |
|---|---|
| Acid value: $2.22 \times 10^{-4}$ | Acid value: $2.19 \times 10^{-4}$ mequiv./g |

EXAMPLE 1

400 ml of benzene, 60 ml of anisole and 39 g of styrene are added, under $N_2$ protection to a 1 liter glass flask fitted with stirrer, reflux condenser and dropping funnel. The mixture is cooled to 0° C. Subsequently, 26.0 mmoles of butyllithium in 40 ml hexane are added rapidly. The polymerization proceeds exothermically, and the reaction mixture is maintained at 10° - 30° C by cooling. After 1 hour, the red-colored solution of 1-lithiumpolystyrene is added dropwise to an ice-cooled solution of 107 g of the previously prepared α,ω-dichloropolydimethylsiloxane in 200 ml hexane and 50 ml dioxane, care being taken to exclude air and moisture. The 1-lithiumpolystyrene solution decolorizes instantaneously as the reaction partners are mixed, and lithium chloride precipitates. At the end of the addition, the solution is concentrated to about half its volume and then filtered. For isolating the product, the filtrate is stirred into 3 to 4 times its volume of methanol. The precipitate is washed several times with ethanol and subsequently dried in vacuum at 70° C. 132 g of a highly viscous, opaque product are obtained.

Analysis gave the following values:

| Calculated: | | Found: | |
|---|---|---|---|
| C: | 48.1% | C: | 51.0% |
| H: | 7.9% | H: | 7.6% |
| Si: | 28.3% | Si: | 26.4% |

EXAMPLE 2

162 g of butadiene are condensed, under an atmosphere of $N_2$, into a reaction vessel fitted with reflux condensor, stirrer, dropping funnel and internal thermometer, and cooled to −20° C. 600 ml of n-hexane and 60 ml of anisole are added and the temperature of the mixture is again adjusted to −20°. 214 mmoles of n-butyllithium are then rapidly added dropwise. The reaction mixture is slowly warmed to 20° to 30° C and maintained at this temperature until refluxing could no longer be observed. The temperature is then raised to 40° C and maintained there until butadiene no longer refluxes. The total polymerization time is 6 hours.

The reaction solution is then slowly added dropwise at 0° C to a solution of 91.7 g of trichloropolydimethylsiloxane of the general formula

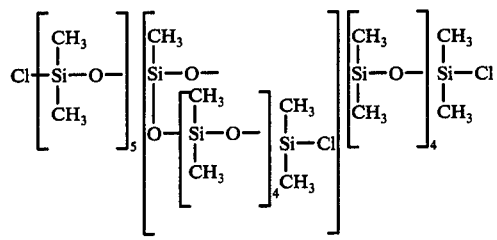

in 200 ml n-hexane and 50 ml dioxane. The trichloropolydimethylsiloxane, whose acid value was 2.32 + $10^{-3}$ equiv./g, had been at least approximately equilibrated. The pale yellow solution of 1-lithiumpolybutadiene decolorizes instantaneously and a fine, crystalline precipitate of LiCl forms after a short time. At the end of the addition, stirring is continued for a further hour at 25° C and the solution is subsequently filtered. After removing the solvent and drying the residue at 80° C and 0.1 mm Hg, a clear liquid product is obtained. η = 520 cP. The block copolymer has the $A_3B$ configuration and an average molecular weight of 3800.

| Calculated: | | Found: | |
|---|---|---|---|
| C : | 71.2 weight% | C : | 70.8 weight% |
| H : | 10.1 weight% | H : | 9.4 weight% |
| Si : | 11.85 weight% | Si : | 12.4 weight% |

EXAMPLE 3

A branched, at least approximately equilibrated trichloropolydimethylsiloxane of the general formula

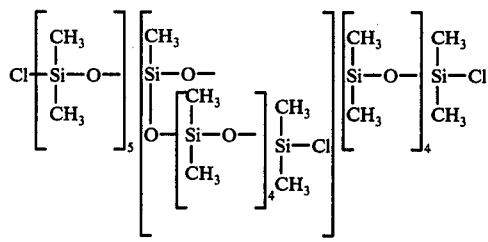

is prepared by mixed hydrolysis of 968 g of dichlorodimethylsilane and 74.8 g of methyltrichlorosilane with 135 g of H₂O and subsequent equilibration of the hydrolysate with 1.17 g of FeCl₃ in the presence of a small amount of dry HCl. After filtering the crude product over active charcoal, a clear, viscous liquid is obtained.

| Calculated: | Found: |
|---|---|
| Acid value: 2.37 × 10⁻³ equiv./g | Acid value: 2.32 × 10⁻³ equiv./g |

62.4 g of styrene are polymerized with 60 mmole of butyllithium in a mixture of 400 ml of benzene and 60 ml anisole, by the same procedure as in Example 1. The solution of the lithiumfunctional polymerisate is reacted, also analogously with Example 1, with 25.9 g of the previously prepared trifunctional polysiloxane. After precipitation with methanol and repeated washing with ethanol, an amorphous solid product is obtained that is finally dried at 60° C and 1 mm Hg. Softening point: ≈76° C.

| Calculated: | Found: |
|---|---|
| C : 78.6 weight% | C : 79.0 weight% |
| H : 7.8 weight% | H : 8.2 weight% |
| Si : 8.65 weight% | Si : 8.2 weight% |

EXAMPLE 4

A linear, at least approximately equilibrated α,ω-dichloropolydimethylsiloxane with an average chain length of N = 200, was prepared by telomerizing 296 g of octamethylcyclotetrasiloxane with 2.58 g of dichlorodimethylsilane and subsequently equilibrating with a FeCl₃/HCl catalyst system. After separating the residual catalyst, a clear, viscous product was obtained.

| Calculated: | Found: |
|---|---|
| Acid value: 1.33 × 10⁻⁴ equiv/g | Acid value: 1.34 × 10⁻⁴ equiv./g |

Analogously to the procedure of Example 1, a polystyrene-polydimethylsiloxane-polystyrene block copolymer with $M_n$(polystyrene) ≈ 3100 and $M_n$(polydimethylsiloxane) ≈ 15000 was prepared from 62.4 g of styrene, 20 mmoles of butyllithium and 134.5 g of the above-named polysiloxane. The product has wax-like character.

| Calculated: | Found: |
|---|---|
| C : 51.0 weight% | C : 54.2 weight% |
| H : 7.6 weight% | H : 7.2 weight% |
| [SiO(CH₃)₂] : 71.5 weight% | [SiO(CH₃)₂] : 65.0 weight% |

EXAMPLE 5

348 g of dichlorodimethylsilane and 44.8 g of methyltrichlorosilane are mixed-hydrolyzed with 52.2 g H₂O. The resulting hydrolysate was subsequently equilibrated with a catalyst, consisting of dimethylformamide . 2HCl in amounts of 0.02 mole/Si atom, to an, on the average pentafunctional, chloropolysiloxane of the general structure

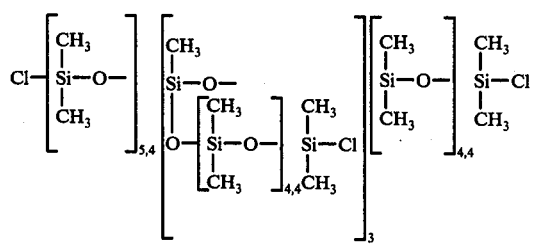

| Calculated: | Found: |
|---|---|
| Acid value: 2.15 × 10⁻³ equiv./g | Acid value: 2.03 × 10⁻³ equiv./g |

112.5 g of styrene are polymerized with 90 mmoles of n-butyllithium in a mixture of 400 ml benzene and 60 ml anisole, by a procedure that is analogous to that given in Example 1. The 1-lithiumpolystyrene that is formed, is reacted with 73.8 g of the above-described, equilibrated pentachloropolymethylsiloxane. A block copolymer is formed that still contains, on the average, two ≡SiCl groups per molecule. These residual SiCl groups are hydrolyzed with NaOCCH₃/CH₃COOH buffered water in heterogeneous phase. The solution of the block copolymer is subsequently washed repeatedly in a separating funnel with water. Precipitation with methanol, repeated washing with ethanol and drying at 30° C under vacuum yields 170 g of a branched block copolymer of average configuration A₃B (A = polystyrene), that contains approximately 0.5 weight% of SiOH groups and has a softening point of 60° C.

| Calculated: | Found: |
|---|---|
| C : 71.6 weight% | C : 73.8 weight% |
| H : 7.3 weight% | H : 6.8 weight% |
| Si : 13.5 weight% | Si : 12.4 weight% |

100 parts of the block copolymer, prepared in the above example, are dissolved in 200 parts of toluene and the solution is admixed with 5 parts of trisacetoxymethylsilane and 2 parts of dibutyltindilaurate. A portion of this solution is poured onto a glass plate. A strong, insoluble, transparent film is formed on evaporation of the solvent to the atmosphere.

EXAMPLE 6

By cohydrolysis of α,ω-dichlorohexadimethylsiloxane and (CF₃)₂CFO(CH₂)₃SiCl₃ in the molar ratio of 1:1, with a lesser amount of water than needed, and subsequent equilibration of the crude product with 0.02 mole of dimethylformamide.2HCl/mole silicon at 100° C, a polyorganosiloxane is obtained whose molecules still contain, on the average, six SiCl functions and whose acid value is 2.27 mequiv./g.

By a procedure, analogous to that described in Example 1, a 1-lithium-functional, styrene polymerisate is prepared from 23.6 g of styrene and 22.7 mmole of butyllithium in 300 ml benzene and 50 ml anisole. It is reacted with a solution of 15 g of the previously prepared, Rf-group containing polysiloxane in 200 ml of hexane and 50 ml of dioxane. In this way, only 2/3 (66.6%) of the SiCl functions present in the polysiloxane are reacted. The remaining SiCl groups are hydrolyzed with 10 ml isopropylamine in 40 ml H₂O. Subsequently, the organic phase is separated, washed repeatedly with H₂O and then stirred into twice its volume of methanol. The precipitate is washed with ethanol and dried at 40° C and 0.1 mm Hg. 35 g of a colorless, solid material, of softening point: 58° C, are obtained, which can be poured from the melt or from solution to form transparent films.

EXAMPLE 7

By a procedure, analogous to that described in Example 2, 40.5 g of butadiene are polymerized with 50 mmole of butyllithium in 300 ml of n-hexane and 50 ml of anisole. At the end of the butadiene polymerization, the reaction solution is cooled to −50° C. 78 g of styrene, 100 ml of toluene and finally 120 ml of tetrahydrofuran are thereafter added. The polymerization of the styrene takes place with intensive reddening of the solution and marked evolution of heat immediately after addition of the tetrahydrofuran. After 30 minutes, during which time the solution warms up to room temperature, the polymerization of the styrene is completed. The solution of the 1-lithium-functional polybutadiene/polystyrene block copolymer is now added dropwise to the solution of 28.2 g of an at least approximately equilibrated, dichloropolydimethylsiloxane of the general structure

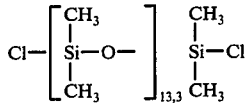

of acid value 1.78 mequiv./g, in 200 ml of hexane and 50 ml of dioxane with ice cooling. The reaction takes place instantaneously, with decolorization of the polybutadiene/polystyrenelithium solution and precipitation of lithium chloride.

The solution is concentrated to about half its volume, filtered and stirred into three times its volume of ethanol. A solid, granular precipitate is formed which is washed repeatedly with ethanol and finally dried at 70° C and 1 mm Hg. The product has a softening point of 78° C.

| Calculated: | | Found: | |
|---|---|---|---|
| C : | 81.6 weight% | C : | 84.8 weight% |
| H : | 8.0 weight% | H : | 7.7 weight% |
| Si : | 6.7 weight% | Si : | 4.8 weight% |

What is claimed is:

1. A process of preparing block copolymers of linear or branched, terminally functional polyorganosiloxanes and organic polymers with organoalkali-functional end groups, which comprises reacting
   (a) at least approximately equilibrated polyorganosiloxanes having reactive silyl end groups of the general formula

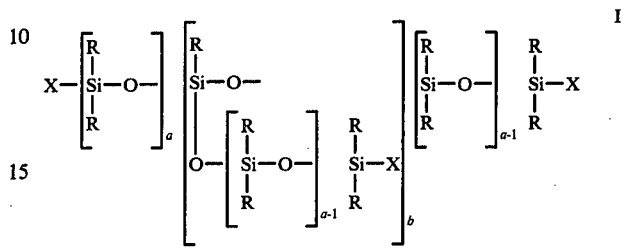

wherein
   X is halogen and/or the group R'SO₃ in which R' is alkyl, aryl, or alkaryl,
   R is alkyl or aryl,
   in the average molecule $a = 2$ to 200 and $b = 0$ to 50,
   the ratio of R groups which are linked to non-trifunctional Si atoms to those R groups which are linked to trifunctional Si atoms being at least 4, with
   (b) terminally organoalkali-functional organic polymers,
   whereby alkali halide or alkali sulfonate splits off and said block copolymers are formed, and recovering said block copolymers.

2. The process according to claim 1, wherein in said formula I
   X is chlorine and/or the group R'SO₃ group, in which R' is methyl or p-tolyl,
   R is methyl and
   $a = 6$ to 100 and
   $b = 0$ to 10.

3. The process according to claim 1, wherein said polymer (b) is a terminally lithium-functional polymer.

4. The process according to claim 3, wherein said terminally lithium-functional organic polymer is α-lithium-polystyrene or α,ω-dilithiumpolystyrene.

5. The process according to claim 3, wherein said terminally lithium-functional polymer is α-lithium-polybutadiene or α,ω-dilithiumpolybutadiene.

6. The process according to claim 3, wherein the terminally lithium-functional organic polymers are α-lithium-or α,ω-dilithium-polystyrene/polybutadiene block copolymers.

7. The process according to claim 1, wherein a portion of the R groups is H, —C₂H₅, n—C₃H₇—, C₆H₅—, —CH₂Br, —(CH₂)₃Cl, —(CH₂)₃OCF(CF₃)₂, —(CH₂)₃OC(CF₃)₂CF(CF₃)₂, —CH₂CH₂CF₃.

8. The process of claim 1, wherein the values for a and b are chosen such that the number of Si-atoms in the average molecule is between 6 and 500.

9. The process of claim 1, wherein a portion of X consists of trimethylsiloxy.

10. The process of claim 1, wherein at least 3% of all X groups are said R'SO₃ groups. cm 11. The process of claim 1, wherein said reaction is carried out in an aprotic medium under exclusion of air and moisture.

11. The process of claim 1, wherein said reaction is carried out in an aprotic medium under exclusion of air and moisture.

12. The process of claim 1, wherein the reaction is carried out in the presence of a diluent which is a saturated aliphatic, cycloaliphatic or aromatic hydrocarbon or an acyclic or cyclic ether.

13. The process of claim 1, wherein the reaction is carried out at a temperature between −70° and +150° C.

14. The process of claim 1, wherein the reaction is carried out by adding a solution of (b) to a solution of (a).

15. The process of claim 1, wherein said block copolymers are recovered by precipitating them in lower molecular alcohols.

* * * * *